US012601666B1

(12) United States Patent
Ramotowski et al.

(10) Patent No.: US 12,601,666 B1
(45) Date of Patent: Apr. 14, 2026

(54) TEST SAMPLE FOR MEASURING ADHESIVE STRENGTH UNDER TENSION

(71) Applicant: The United States of America as represented by the Secretary of the Navy, Newport, RI (US)

(72) Inventors: Thomas S Ramotowski, Tiverton, RI (US); Anthony S Poirier, Westport, MA (US); Eric A Warner, Coventry, RI (US)

(73) Assignee: The United States of America as represented by the Secretary of the Navy

( * ) Notice: Subject to any disclaimer, the term of this patent is extended or adjusted under 35 U.S.C. 154(b) by 926 days.

(21) Appl. No.: 17/879,087

(22) Filed: Aug. 2, 2022

(51) Int. Cl.
*G01N 3/24* (2006.01)

(52) U.S. Cl.
CPC ....... *G01N 3/24* (2013.01); *G01N 2203/0091* (2013.01); *G01N 2203/0429* (2013.01)

(58) Field of Classification Search
CPC ........... G01N 19/04; G01N 2203/0091; G01N 2203/0429
USPC ................... 73/856, 150 A, 827, 842, 150 R
See application file for complete search history.

(56) References Cited

FOREIGN PATENT DOCUMENTS

| CN | 108106991 A | * | 6/2018 | ............. | G01N 19/04 |
| CN | 108732090 A | * | 11/2018 | ............. | G01N 19/04 |
| CN | 208968963 U | * | 6/2019 | | |
| CN | 110175396 A | * | 8/2019 | ............. | G06F 30/23 |
| CN | 111766202 A | * | 10/2020 | ............. | G01N 19/04 |
| CN | 222882564 U | * | 5/2025 | | |

* cited by examiner

*Primary Examiner* — Laura Martin
*Assistant Examiner* — Nashmiya S Fayyaz
(74) *Attorney, Agent, or Firm* — James M. Kasischke; Jeffry C. Severson

(57) ABSTRACT

A test sample is provided for measuring tensile strength of an adhesive bond between two identical substrates. Each identical substrate has first and second identical ends. An end from one substrate is aligned with an end from the other substrate so that they completely overlap and abut each other. Adhesive is applied to the abutting ends. An alignment fixture aligns the substrates while the adhesive cures. Each substrate includes through holes for mounting to a test machine without the use of special grips. After a test sample has been tested to failure, a new test sample can be quickly made by reversing the orientation of the substrates by 180 degrees and using their opposite ends to make a new test sample. After both ends of a substrate have been used for testing, both ends can be cleaned and the substrates reused for new test samples.

12 Claims, 11 Drawing Sheets

TEST SAMPLE FOR MEASURING ADHESIVE STRENGTH UNDER TENSION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention is a method and apparatus to measure the tensile strength of an adhesive bond between two rigid substrates.

(2) Description of the Related Art

The measurement of the tensile strength of an adhesive bond between two rigid substrates is important for many applications. Generally, these substrates are metal but this test can be performed with any substrate material that is stronger in tension than the adhesive. To obtain a desirable low standard deviation for adhesive strength measurements under tension, many samples need to be tested. Thus, samples should be designed for ease of manufacture so that many essentially identical samples can be produced and tested. Tensile adhesive bond samples need perfect alignment between two substrates so that the bonded regions completely overlap each other. Conventionally, samples were held in special grips while being tested on a universal testing machine, for example, an INSTRON® universal testing machine.

One method used to measure the tensile strength of an adhesive bond between two substrates is ASTM Standard D-897, Standard Test Method for Tensile Properties of Adhesive Bonds. The ASTM standard specifies the design and shape of samples for testing tensile properties of adhesive bonds. The sample design required by the ASTM standard is complex, not conducive to mass production and requires special grips to mount the samples onto a universal test machine.

The conventional special grips for the test machines are provided with male portions having through holes. The male portions of the grips fit in female portions of the test machine and are fixed in place with pins placed in openings in the female portions of the test machines and in the corresponding through holes in the male portions of the grips.

A need exists for a simpler method and apparatus for testing the tensile strength of adhesive bonds between two substrates.

BRIEF SUMMARY OF THE INVENTION

Accordingly, it is a primary object and general purpose of the present invention to provide an easily fabricated and mounted test sample for tensile testing of adhesive bonds between two substrates.

To realize the objects and purposes of the invention, a test sample for measuring tensile strength of an adhesive bond between two substrates includes a pair of identical substrates. Each identical substrate is bilaterally symmetric, has a central longitudinal axis and has first and second ends. The first and second ends of the substrates are defined by planes that are normal to the central longitudinal axes of the substrates. The first and second ends define the same cross-sectional shape and area. At least a portion of the bilaterally symmetric substrate has at least one flat side.

Each bilaterally symmetric substrate includes opposed end portions wherein each opposed end portion defines a through hole. Center lines of the through holes are parallel and located equidistant from the first and second ends of the bilaterally symmetric substrate, for precise alignment of the test sample on a testing machine.

In one embodiment of the invention, the first and second ends of the bilaterally symmetric substrate define a circular cross-section. The portion of the bilaterally symmetric substrate that has at least one flat side is longitudinally disposed between the through holes defined in the opposing end portions.

In one embodiment, an entirety of the bilaterally symmetric substrate has a hexagonal cross-section.

The objects and purposes of the invention are further realized by a method of making a test sample to measure tensile strength of an adhesive bond between two substrates. The method includes providing first and second identical bilaterally symmetric substrates. Each bilaterally symmetric substrate has a central longitudinal axis and first and second ends. The first and second ends are defined by planes that are normal to the central longitudinal axis. The first and second ends define the same cross-sectional shape and area. Each identical bilaterally symmetric substrate includes opposed end portions wherein each opposed end portion defines a through hole. Center lines of the through holes are parallel and equidistant respectively from the first and second ends, for precise alignment of the substrates on a testing machine. At least a portion of each identical bilaterally symmetric substrate has at least one flat side.

The method includes applying adhesive to at least one end of one of the first and second identical bilaterally symmetric substrates. The first and second identical bilaterally symmetric substrates are aligned such that the at least one end of one of the bilaterally symmetric substrates having the adhesive completely overlaps and abuts one of the first and second ends of the other of the bilaterally symmetric substrates. The adhesive between the aligned first and second identical bilaterally symmetric substrates is then cured.

The step of aligning includes aligning the first and second identical bilaterally symmetric substrates such that the center lines of the through holes in the opposing ends of the first and second bilaterally symmetric substrates are parallel to each other.

The step of aligning includes placing the first and second identical bilaterally symmetric substrates in an L-bracket such that a face of the portion of each identical bilaterally symmetric substrate that has the at least one flat side lies flat against the same side of the L-bracket.

The step of aligning includes clamping the first and second identical bilaterally symmetric substrates in the L-bracket while the adhesive cures.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DETAILED DESCRIPTION OF THE INVENTION

The invention includes an apparatus and method for measuring the tensile strength of adhesive bonds between two substrates. More particularly, the apparatus of the invention has a first longitudinal substrate that is adhesively bonded to a second longitudinal substrate to form a test sample. The first and second longitudinal substrates are bilaterally symmetric and identical. After the first and second longitudinal substrates are adhesively bonded together, the test sample is placed in a testing machine to measure the tensile strength of the adhesive bond between the first and second longitudinal substrates.

A purpose of the invention is to simplify the design and manufacture of the adhesive bond tensile measurement test sample. Another purpose of the invention is to simplify the adhesive bond tensile measurement testing method by eliminating the need for the conventional special grips required to mount test samples onto a universal test machine. In the invention, through holes are made directly in the test samples which are then fixed to the test machine with pins.

Figure 1:
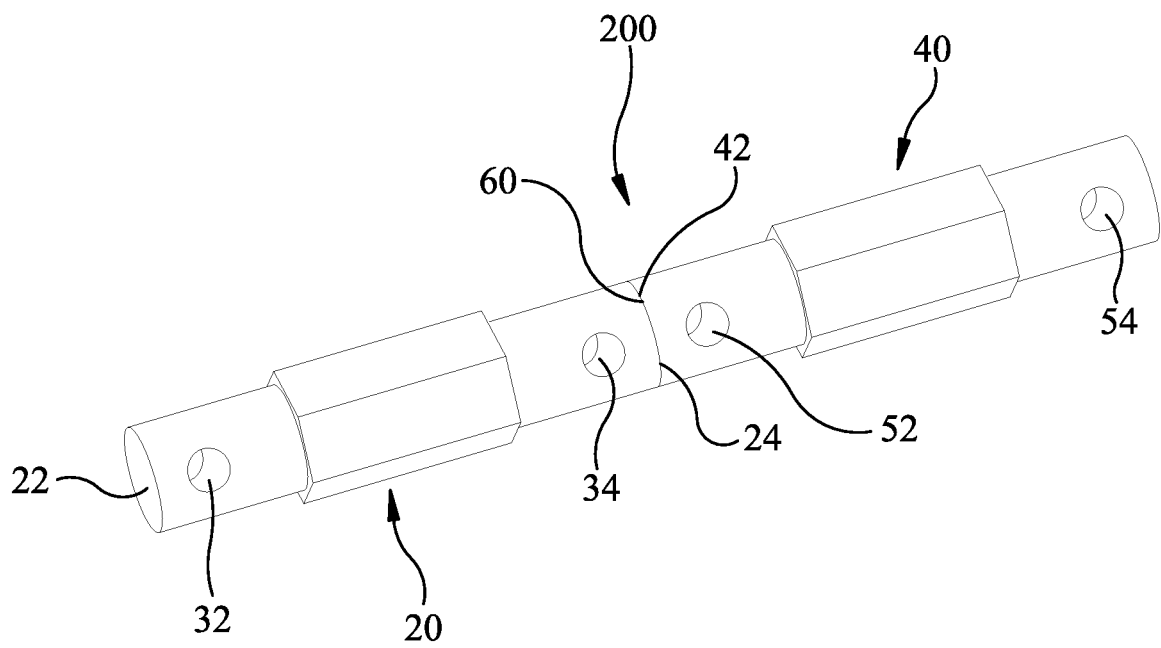
FIG. 1 illustrates a perspective view of one embodiment of a test sample for measuring the tensile strength of an adhesive bond.
Figure 2A:
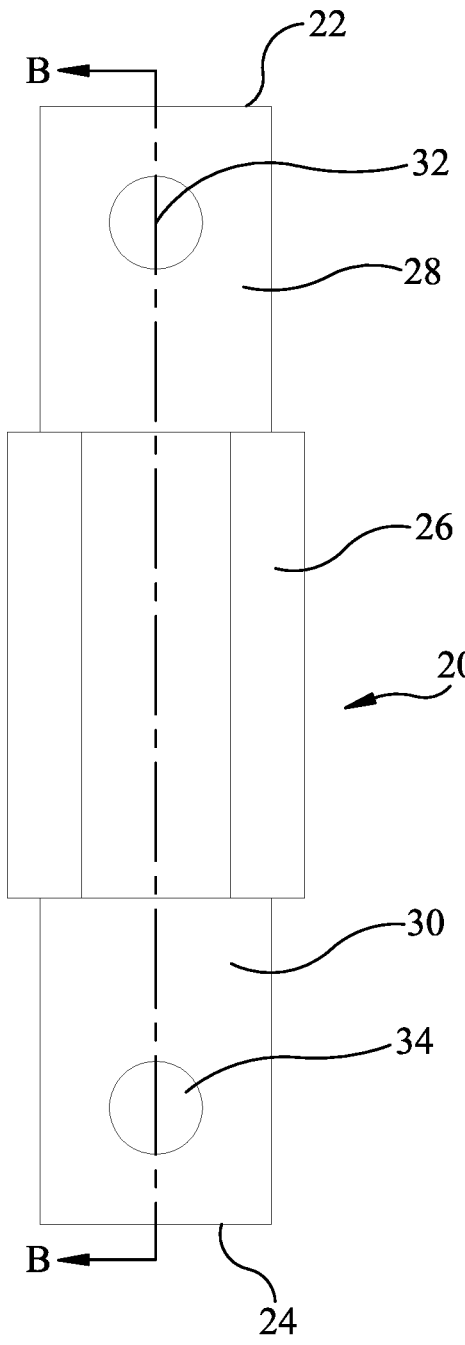
FIG. 2A illustrates an elevation view of one embodiment of one of a pair of substrates used to construct a test sample.
Figure 2B:
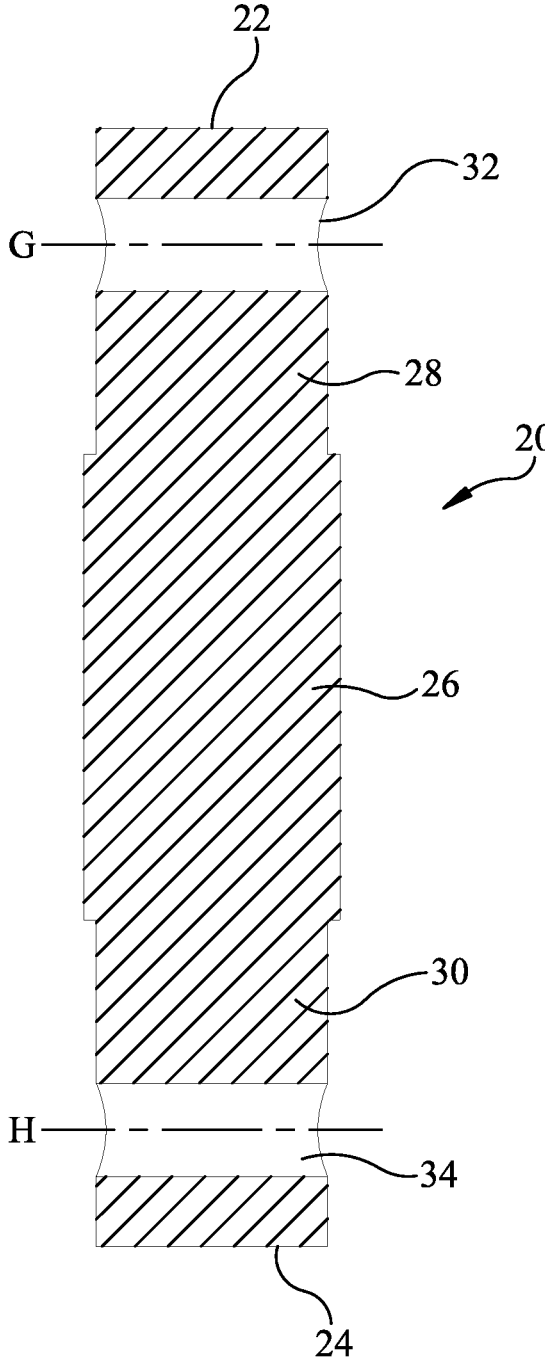
FIG. 2B illustrates a sectional view taken along the line B-B of FIG. 2A.
Figure 2C:
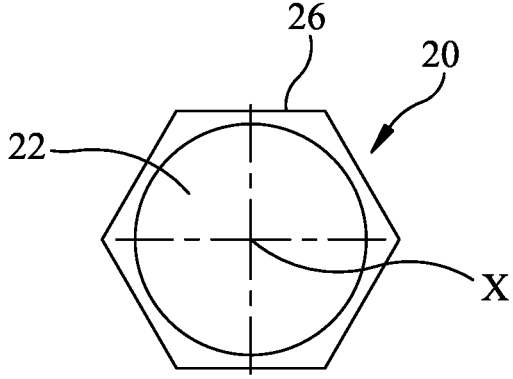
FIG. 2C illustrates a plan view of FIG. 2A.
Figure 3A:
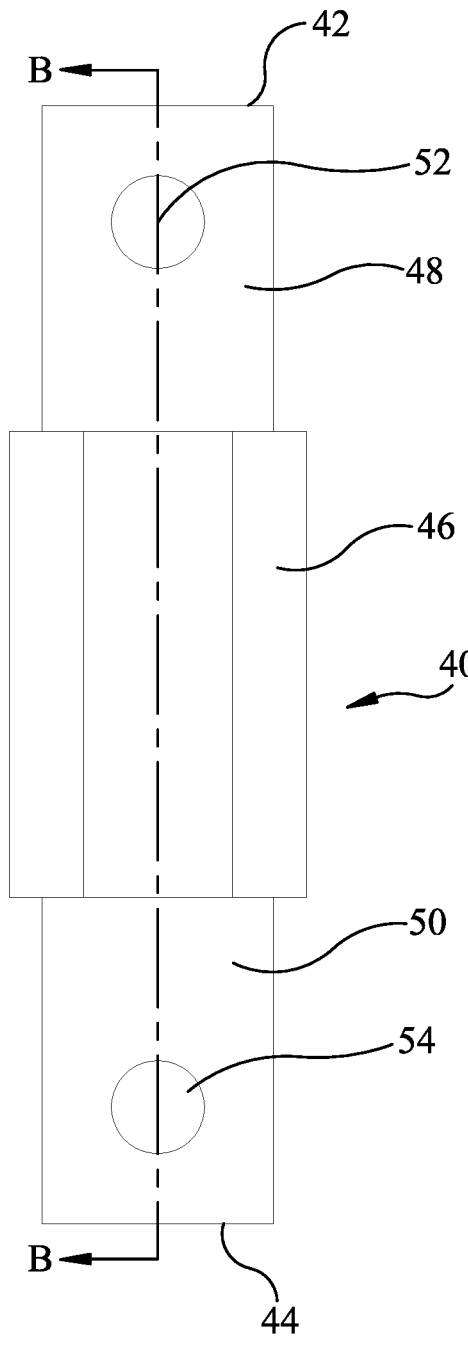
FIG. 3A illustrates an elevation view of one embodiment of the other of the pair of substrates used to construct a test sample.
Figure 3B:
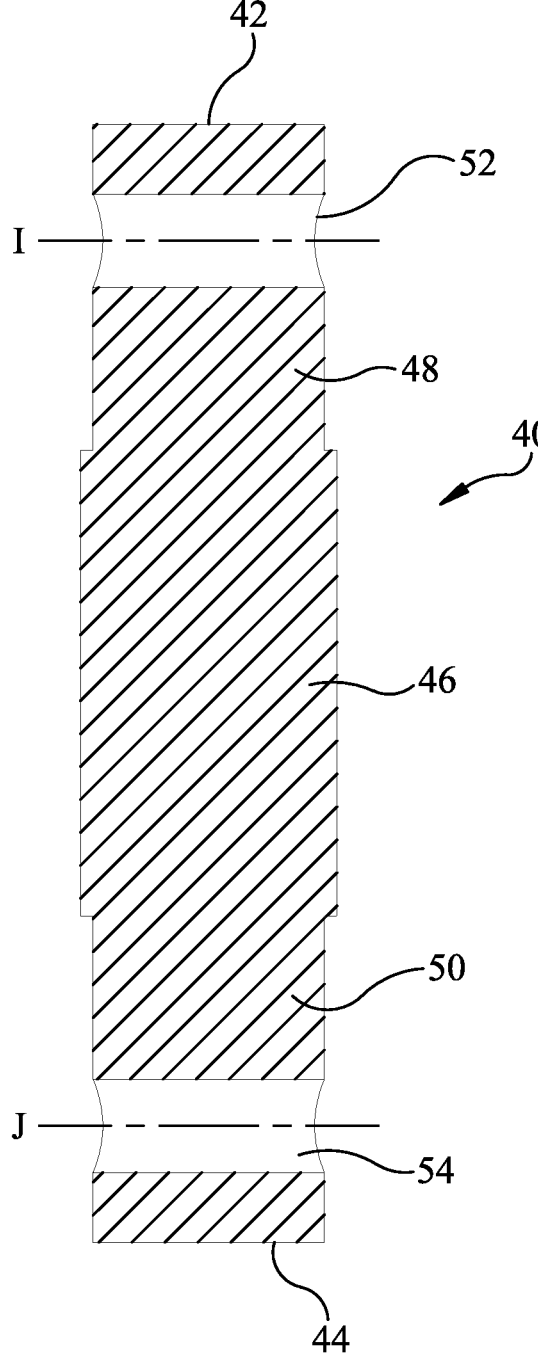
FIG. 3B illustrates a sectional view taken along the line B-B of FIG. 3A.
Figure 3C:
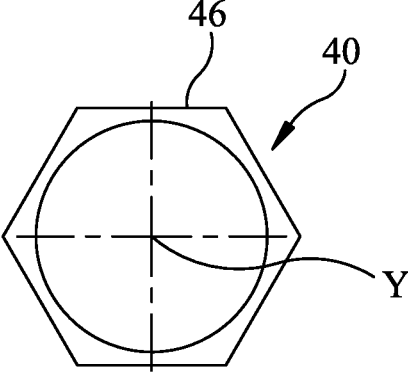
FIG. 3C illustrates a plan view of FIG. 3A.

FIG. 1 illustrates a perspective view of one embodiment of a test sample 200 for measuring the tensile strength of an adhesive bond between two substrates 20 and 40. Substrates 20 and 40 can be machined from metal stock, such as, for example, aluminum or steel. FIGS. 2A-2C illustrate elevation, sectional and plan views of substrate 20. FIGS. 3A-3C illustrate elevation, sectional and plan views of substrate 40.

Substrate 20 is identical in structure with substrate 40. Referring to FIGS. 2A-C, substrate 20 is bilaterally symmetric and defines a central longitudinal axis X (FIG. 2C). Substrate 20 includes first and second ends 22, 24 defined by planes that are normal to central longitudinal axis X. First and second ends 22, 24 define the same cross-sectional shape and area. In the embodiment of FIG. 2A-C, ends 22 and 24 are circular. Substrate 20 includes opposed end portions 28, 30. Each opposed end portion 28, 30 defines a respective through hole 32, 34. Center lines G, H (FIG. 2B) of the respective through holes 32, 34 are parallel and located equidistant from first and second ends 22, 24 of substrate 20, thereby enabling precise alignment of through holes 32, 34 with holes on a universal testing machine, such as an INSTRON® universal testing machine.

Substrate 20 includes at least a portion 26 that defines a hexagonal cross-section. Portion 26 of hexagonal cross-section is longitudinally disposed between through holes 32, 34. In FIGS. 2A-C, except for portion 26, substrate 20 has a circular cross-section.

As illustrated in FIGS. 3A-C, substrate 40 is bilaterally symmetric and defines a central longitudinal axis Y (FIG. 3C). Substrate 40 includes first and second ends 42, 44 defined by planes that are normal to the central longitudinal axis Y. First and second ends 42, 44 define the same cross-sectional shape and area. In the embodiment of FIG. 3A-C, ends 42, 44 are circular. Substrate 40 includes opposed end portions 48, 50. Each opposed end portion 48, 50 defines a respective through hole 52, 54. Center lines I, J (FIG. 3B) of respective through holes 52, 54 are parallel and located equidistant from first and second ends 42, 44 of substrate 40, thereby enabling precise alignment of through holes 52, 54 with holes on a universal testing machine, such as an INSTRON® universal testing machine. The universal testing machine includes cylindrical pins that are placed in the through holes in the ends of the substrates that are farthest apart after test sample 200 is made. For example, in FIG. 1 the cylindrical pins of the testing machine would be placed in through holes 32 and 54 of test sample 200.

Substrate 40 includes least a portion 46 that defines a hexagonal cross-section. Portion 46 of hexagonal cross-section is longitudinally disposed between through holes 52, 54. In FIGS. 3A-C, the remainder of substrate 40 has a circular cross-section. While a hexagonal cross-section is not absolutely necessary for portions 26 and 46, these portions should have a greater mean diameter than that of ends 28, 30, 48, and 50. At least one surface of portions 26 and 46 should be flat to allow alignment. This will be described hereinafter with respect to FIGS. 5-7. A hexagonal cross-section is preferred because hexagonal stock is readily available.

As illustrated in FIG. 1, an adhesive 60 adheres end 24 of substrate 20 to end 42 of substrate 40. Because substrates 20 and 40 are identical, either end of either substrate could be adhered to either end of the other substrate. An advantage of identical substrates 20 and 40 is that, after a test sample 200 has been pulled to failure on a universal testing machine, the now separate substrates 20 and 40 can be re-used immediately simply by turning the substrates around 180 degrees so that opposite ends of each substrate can be attached to each other with adhesive 60. After both ends of each substrate 20, 40 have been used once, any cured adhesive 60 remaining on their ends can be abraded away and the freshly cleaned surfaces can be used to make new test samples 200.

Figure 4:
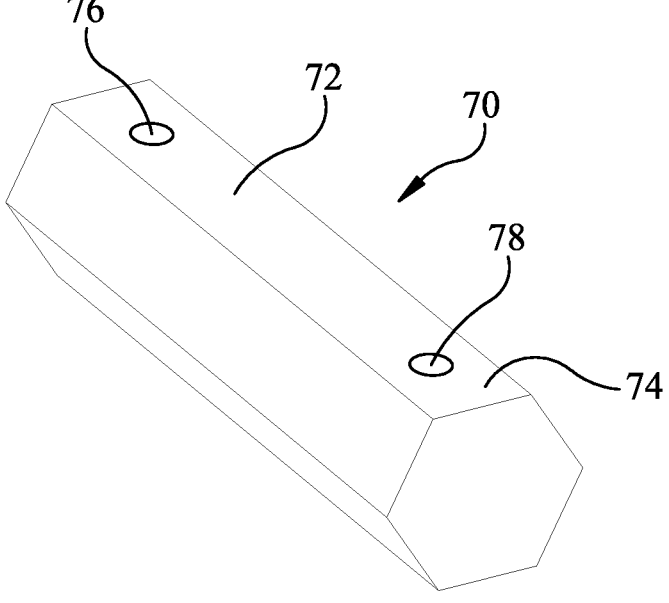
FIG. 4 illustrates a perspective view of a hexagonal substrate.

FIG. 4 illustrates a perspective view of a hexagonal substrate 70. Rather than machine the end portions 72, 74 of substrate 70 to a circular cross-section, hexagonal substrate 70 can be used in its hexagonal form to make a substrate for a test sample. In that case, the universal test machine would have test sample holders or chucks that accept test samples with hexagonal cross-sections. In a manner similar to the method of holding the circular end portions of test sample 200 in a test machine, for a test sample made from a pair of identical substrates 70 the pins of the test machine fit in corresponding through holes 76, 78 in the end portions 72, 74 of the pair of identical substrates 70.

Figure 5:
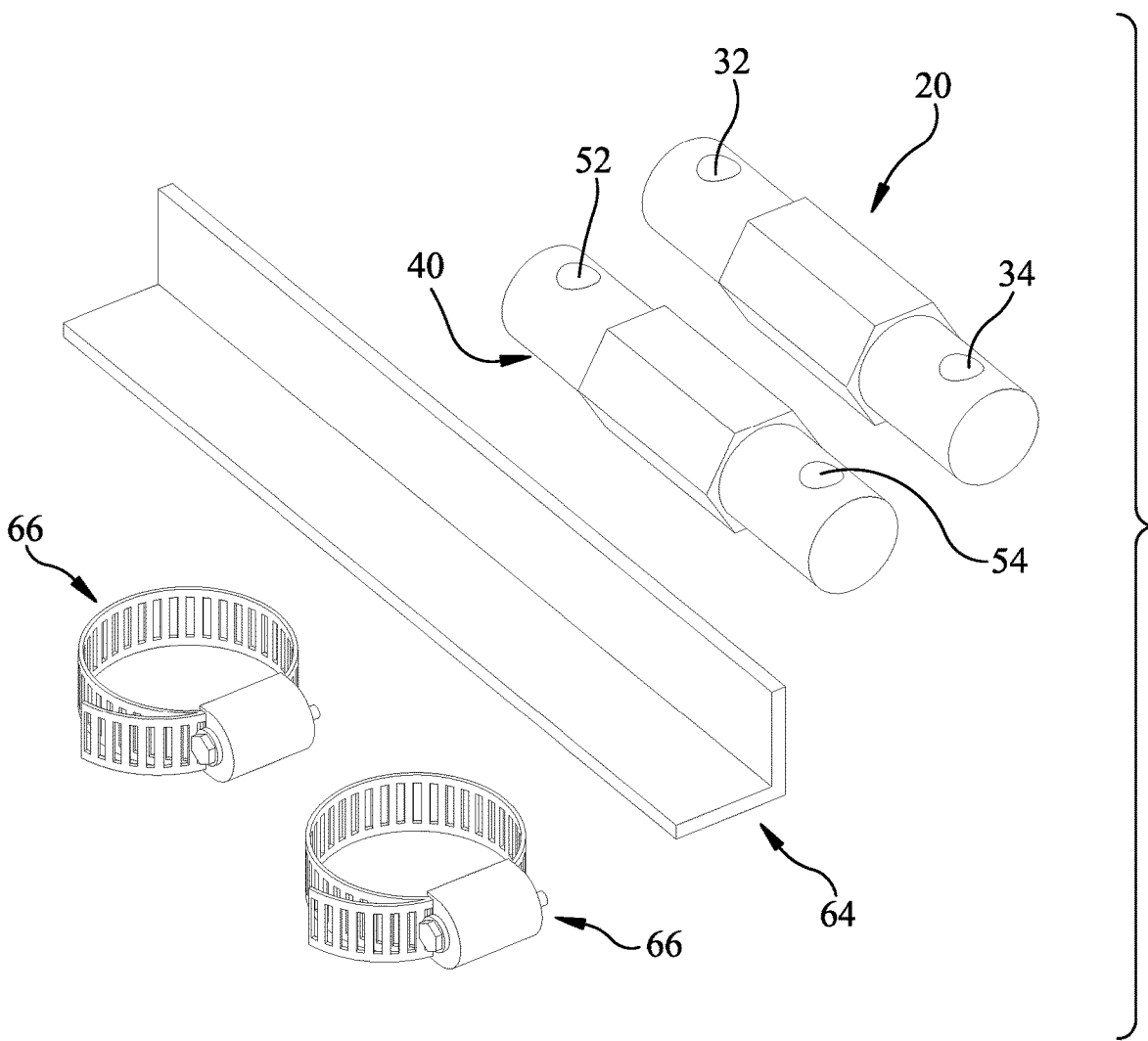
FIG. 5 illustrates components used to make a test sample for measuring the tensile strength of an adhesive bond.

As an example, test sample 200 (FIG. 1) was made by providing the components shown in FIG. 5, including identical bilaterally symmetric substrates 20, 40; metal L-bar 64; and two clamps 66, 66. Substrates 20, 40 have through holes 32, 34 and 52, 54 in respective opposed ends. Adhesive 60 is applied to at least one end of one of substrates 20, 40.

Substrates 20, 40 are aligned such that the end having adhesive 60 completely overlaps and abuts one of the first and second ends of the other of the substrates, as shown in FIG. 1.

Figure 6:
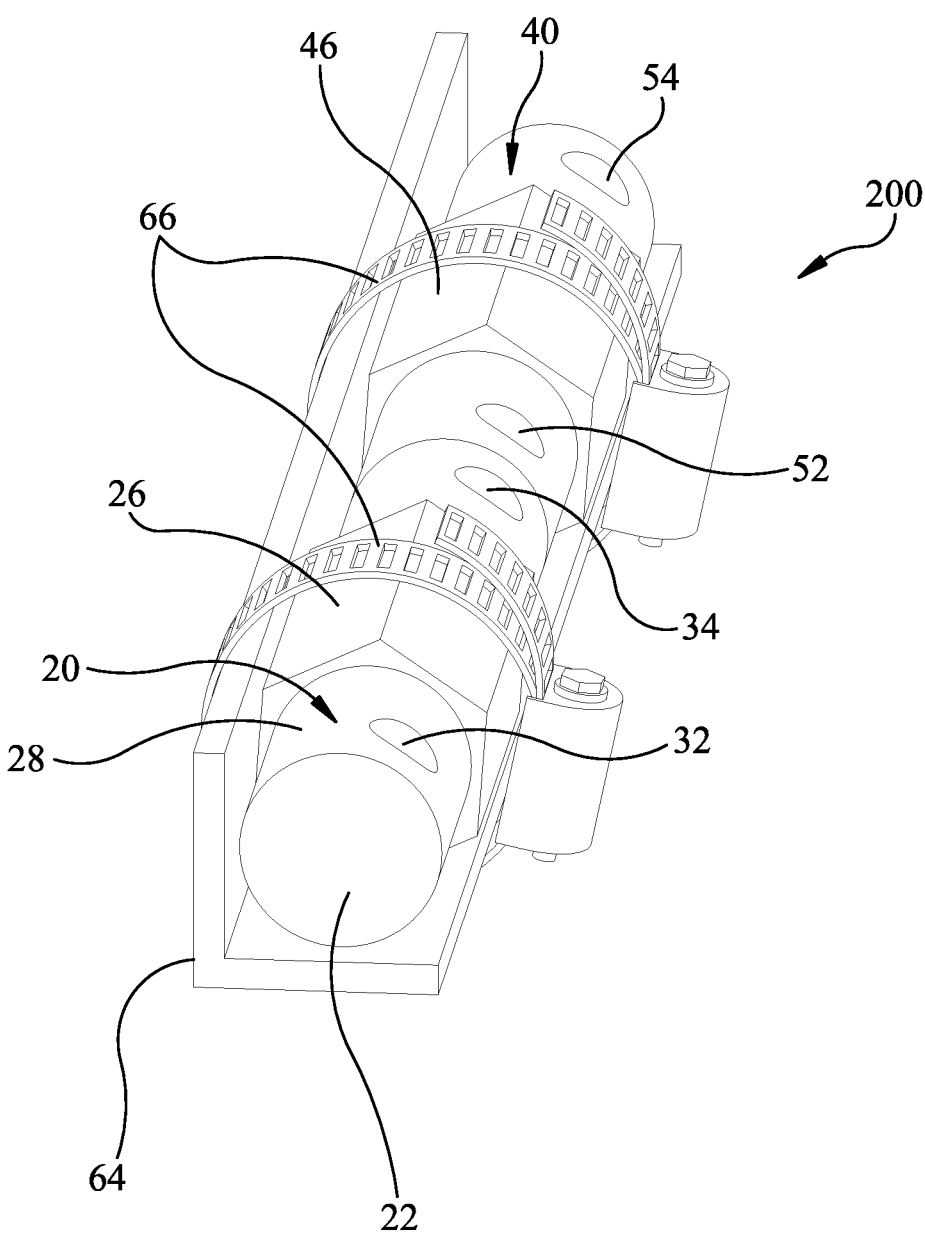
FIG. 6 illustrates an end view of a test sample mounted to an L-bar.
Figure 7:
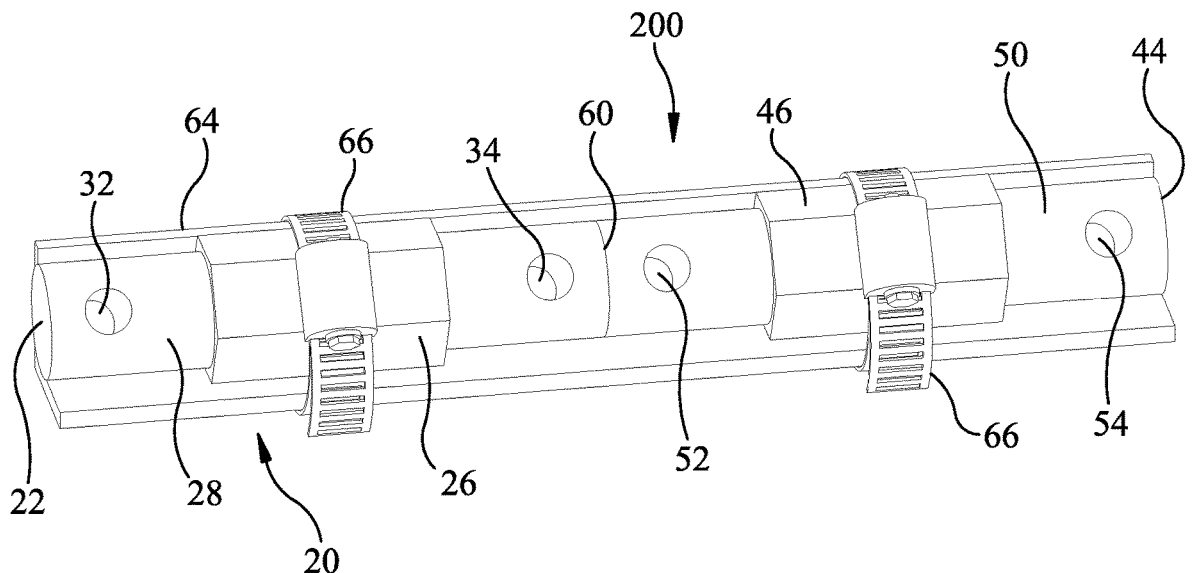
FIG. 7 illustrates a side view of a test sample mounted to an L-bar.

To ensure the end bonding surfaces of substrates 20, 40 are precisely aligned with each other and overlap 100%, the two substrates 20, 40 are placed into an alignment fixture. The fixture is a piece of L-bar 64 made of, for example, aluminum. As illustrated in FIGS. 6 and 7, the substrates 20, 40 are placed in the L-bar 64 so that one of the hexagonal faces of each substrate 20, 40 lies flat against one side of the L-bar 64. The other side of the L-bar contacts a hexagonal corner of the substrates 20, 40 and preserves orthogonal alignment. Alternatively, substrates 20 and 40 could have one flat face for contacting the L-bar 64. The substrates 20, 40 are placed into contact to form an adhesive joint at their contacting ends.

Substrates 20, 40 are held in place in L-bar 64 with, for example, two standard hose clamps 66. Clamps 66 are large enough to encircle the substrate/L-bar combination. Clamps 66 are tightened to ensure good contact between the two end bonding surfaces of substrates 20, 40. Placement of the substrates 20, 40 into the L-bar 64 functions to precisely align two through holes (one of through holes 28, 30 and one of through holes 52, 54) by which the finished test sample 200 will be attached to a universal test machine. When properly aligned in L-bar 64, center lines G, H, I and J of respective through holes 32, 34, 52, 54 will all be parallel. L-bar 64 is sprayed with mold release to prevent any drips of adhesive 60 from bonding to the L-bar itself. An example of a suitable mold release is MS-122AD aerosol mold release available from the Miller-Stephenson Chemical Company.

Adhesive 60 is allowed to cure while test sample 200 is clamped onto L-bar 64. When adhesive 60 is fully cured, clamps 66 are loosened and removed and test sample 200 is removed from L-bar 64. As one alternative to hose clamps 66, C-clamps could be used to hold the substrates 20, 40 to the L-bar 64 while the adhesive 60 cures.

In one embodiment, test sample 200 is mounted in the test machine by inserting a circular end portion (one each of 28 or 30 and 48 or 50) into respective female circular mounting portions of the test machine and inserting two cylindrical pins of the test machine into the through holes of the corresponding end portions of test sample 200.

After a test sample 200 has been tested to failure, new test samples can be quickly made by reversing the orientation of the substrates 20, 40 by 180 degrees and using their opposite ends to make a new test sample 200. The substrates 20, 40 are bilaterally symmetric so that both ends can be used to make test samples. After both ends of substrate 20 or 40 have been used, the substrate ends can be cleaned for reuse by sanding the bonding surfaces to remove all traces of any previously used and cured adhesive 60.

No special fixtures are needed to mount test sample 200 on a universal testing machine, such as an INSTRON® universal testing machine. No grips are needed to hold test sample 200. Rather, test sample 200 is mounted in the test machine by passing a pin (part of the testing machine) through the through holes at each end of test sample 200 in the same manner that grips are connected to the test machine. So, test samples 200 are easily mounted to and dismounted from the test machine.

The bonded area of the test sample 200 may be varied to a reasonable range of values by changing the diameter of the ends of the substrates that make up the test sample 200. Or, the cross-section of the end portions of the substrates may be changed, for example, to a hexagonal cross-section. The mounting portions or chucks of the universal test machine would also be appropriately changed to accommodate a differently shaped cross-sectional end portion of a test sample.

It is important that the through holes 28, 30, 48, 50 in the substrates 20, 40 that receive the mounting pins of the test machine are properly aligned when the test sample 200 is made. Otherwise, it will not be possible to mount the test sample 200 in the test machine. The use of L-bar 64 ensures proper alignment of the through holes located in the different substrates 20, 40. As shown in FIGS. 6 and 7, if the same flat faces of the hexagonal portion of the substrates 20, 40 are placed flat against one side of the L-bar 64, the through holes in the substrates 20, 40 that receive the mounting pins of the test machine will be aligned.

Metal is the preferred material for test sample 200 so that higher temperature heat cures for certain adhesives do not adversely affect the test sample 200. Test samples 200 can be sized to fit inside standard heating/cooling fixtures that are attached to universal testing machines.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A test sample for measuring tensile strength of an adhesive bond comprising:

a first bilaterally symmetric substrate having a central longitudinal axis and first and second ends wherein said first and second ends are planes that are normal to said central longitudinal axis and said first and second ends define a same cross-sectional shape and area, the first and second ends each having a through hole formed therein at a uniform distance from the respective first and second end, the first end through hole and the second end through hole having center lines that are parallel to each other; and a second bilaterally symmetric substrate having a central longitudinal axis and first and second ends wherein said first and second ends are defined by planes that are normal to said central longitudinal axis and said first and second ends define a same cross-sectional shape and area as said first and second ends of said first bilaterally symmetric substrate, the first and second ends each having a through hole formed therein at a uniform distance from the respective first and second end, the first end through hole and the second end through hole having center lines that are parallel to each other;

wherein said first and second bilaterally symmetric substrates each including at least a portion having at least one flat side;

wherein said first and second ends of said first bilaterally symmetric substrate and said first and second ends of said second bilaterally symmetric substrate support the adhesive bond for testing; and wherein adhesive bond testing can be performed utilizing each said first and second end of said first bilaterally symmetric substrate and each said first and second end of said second bilaterally symmetric substrate.

2. The apparatus of claim 1, wherein said first and second ends of said first and second bilaterally symmetric substrates define circular cross-sections.

3. The apparatus of claim 2, wherein said portions of said first and second bilaterally symmetric substrates having at least one flat side are longitudinally disposed between said through holes on each of said first and second bilaterally symmetric substrates.

4. The apparatus of claim 3, wherein said portions of said first and second bilaterally symmetric substrates having at least one flat side have a hexagonal cross-section.

5. The apparatus of claim 4, wherein portions of each of said first and second bilaterally symmetric substrates that do not define said hexagonal cross-sections define said circular cross-sections, said hexagonal cross-section portions having a greater mean diameter than said circular cross-section portions.

6. The apparatus of claim 1, wherein an entirety of each of said first and second bilaterally symmetric substrates has a hexagonal cross-section.

7. A method for making a test sample to measure tensile strength of an adhesive bond between two substrates, the method comprising:

providing first and second identical bilaterally symmetrical substrates, each bilaterally symmetric substrate having a central longitudinal axis and first and second ends wherein said first and second ends are defined by planes that are normal to said central longitudinal axis and said first and second ends define a same cross-sectional shape and area, each said identical bilaterally symmetric substrate including opposed end portions wherein each said opposed end portion defines a through hole and wherein center lines of said through holes are parallel and equidistant respectively from said first and second ends for precise alignment of said substrates on a testing machine, and at least a portion of each said identical bilaterally symmetric substrate has at least one flat side;

applying adhesive to one of said first and second identical bilaterally symmetric substrates at the first end;

aligning said first and second identical bilaterally symmetric substrates such that the bilaterally symmetric substrate having the adhesive completely overlaps and abuts the first end of the other of said bilaterally symmetric substrates;

curing the adhesive between said first and second identical bilaterally symmetric substrates; and further comprising the steps of:

mounting the cured adhesive and said first and second identical bilaterally symmetric substrates combination on a testing machine;

testing the cured adhesive and said first and second identical bilaterally symmetric substrates combination on the testing machine until failure of the cured adhesive;

applying adhesive to at least one of said first and second identical bilaterally symmetric substrates at the second end;

aligning said first and second identical bilaterally symmetric substrates such that the bilaterally symmetric substrate having the adhesive completely overlaps and abuts the second end of the other of said bilaterally symmetric substrates;

curing the adhesive between the second ends of said first and second identical bilaterally symmetric substrates;

mounting said first and second identical bilaterally symmetric substrates and second end adhesive combination on a testing machine; and testing the cured adhesive between the second ends of said first and second identical bilaterally symmetric substrates combination on the testing machine until failure of the cured adhesive.

8. The method of claim 7, wherein aligning includes aligning said first and second identical bilaterally symmetric substrates such that said center lines of said through holes in said opposed end portions of said first and second bilaterally symmetric substrates are parallel to each other.

9. The method of claim 8, wherein aligning includes placing said first and second identical bilaterally symmetric substrates in an L-bracket such that a face of said portion of each said identical bilaterally symmetric substrate that defines a flat side lies flat against a same side of the L-bracket.

10. The method of claim 9, wherein aligning includes fixing said first and second identical bilaterally symmetric substrates to said L-bracket.

11. The method of claim 7, wherein said at least a portion of each said identical bilaterally symmetric substrate having at least one flat side has a hexagonal cross-section.

12. A test sample for measuring tensile strength of an adhesive bond comprising two bilaterally symmetric substrates for use as the test sample, each substrate having a central longitudinal axis, a first end, and a second end, the first end and the second end terminating the substrate in planes that are normal to the central longitudinal axis and have the same cross-sectional shape and area, each substrate having a first through hole formed therein at a predetermined distance from the first end, and a second through hole formed therein at the predetermined distance from the second end such that a centerline of the first through hole is parallel with a centerline of the second through hole, each substrate further having at least one flat side wherein adhesive can be tested can be tested between the first ends of each said bilaterally symmetric substrate, said bilaterally symmetric substrates can be reversed, and adhesive can be tested between the second ends of each bilaterally symmetric substrate.

\* \* \* \* \*